United States Patent
Iyer

(10) Patent No.: US 9,014,706 B2
(45) Date of Patent: *Apr. 21, 2015

(54) WIRELESS MACRO CELL OVERLAY

(75) Inventor: Pradeep J. Iyer, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 13/249,971

(22) Filed: Sep. 30, 2011

(65) Prior Publication Data

US 2012/0020344 A1    Jan. 26, 2012

Related U.S. Application Data

(63) Continuation of application No. 12/261,959, filed on Oct. 30, 2008, now Pat. No. 8,073,449.

(51) Int. Cl.
*H04W 16/32* (2009.01)
*H04W 24/02* (2009.01)
*H04W 48/12* (2009.01)

(52) U.S. Cl.
CPC .............. *H04W 16/32* (2013.01); *H04W 24/02* (2013.01); *H04W 48/12* (2013.01)

(58) Field of Classification Search
CPC . H04W 84/18; H04W 36/0066; H04W 36/14; H04W 12/04; H04W 24/02
USPC ................................................. 455/444, 449
See application file for complete search history.

(56) References Cited

U.S. PATENT DOCUMENTS

| | | | |
|---|---|---|---|
| 2006/0142034 A1* | 6/2006 | Wentink et al. | 455/515 |
| 2006/0153156 A1* | 7/2006 | Wentink et al. | 370/338 |
| 2006/0184695 A1* | 8/2006 | Monette et al. | 709/246 |
| 2007/0254620 A1 | 11/2007 | Lindqvist et al. | |
| 2008/0101291 A1* | 5/2008 | Jiang et al. | 370/331 |
| 2008/0207170 A1* | 8/2008 | Khetawat et al. | 455/411 |

OTHER PUBLICATIONS

U.S. Appl. No. 12/261,959, Notice of Allowance, mailed Sep. 1, 2011.

* cited by examiner

*Primary Examiner* — Gerald Johnson
(74) *Attorney, Agent, or Firm* — Ying Wang

(57) ABSTRACT

Overlaying a Wireless Macro Cell architecture on a Micro Cell network. WLAN MAC Address Translation (WMAT) is used to translate BSSIDs from the BSSID used to initialize a radio in an access node and identify communications between the radio in the access node and a controller, and the BSSID used over the air for Macro Cell operation. WMAT is used for transmit operations, translating the BSSID of outgoing packets to the Macro Cell BSSID prior to wireless transmission. On the receive side, packets undergo WMAT and transmission to the controller if the STN MAC address of the sender is in an ACK table associated with the radio, or the packet is one of a predetermined type. The ACK table is managed by transmit operations, and by control commands from the controller.

20 Claims, 3 Drawing Sheets

WIRELESS MACRO CELL OVERLAY

The present application is a continuation of U.S. patent application Ser. No. 12/261,959, entitled "Wireless Macro Cell Overlay" filed on Oct. 30, 2008, now U.S. Pat. No. 8,073,449. The present invention relates to wireless systems, and in particular, to the problem of overlaying a Macro Cell architecture on top of a Micro Cell network.

BACKGROUND OF THE INVENTION

Wireless networks, such as those operating according to IEEE 802.11 standards typically provide wireless packet-based data services to clients in a network. In one embodiment of a wireless network such as that shown in FIG. 1, referred to as a Micro Cell architecture, each access node 300 has a distinct Basic Service Set Identifier (BSSID) which usually represents the Media Access Control (MAC) address of the radio in the access node. Access nodes advertise access to one or more networks which are identified by Service Set Identifiers (SSID). Multiple access nodes may advertise the same SSID-identified network on the same or different radio channels, but the BSSIDs are distinct. Access nodes 300 are coordinated by controller 200, which also provides access to network 100.

In a Macro Cell network as shown in FIG. 2, multiple access nodes 300 advertise services using the same BSSID and SSID values, operating on the same channel.

What is needed is a way to overlay a macro cell architecture on a micro cell network.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of overlaying a Macro Cell wireless architecture on a Micro Cell wireless network by providing WLAN Mac Address Translation (WMAT) in the access nodes, allowing an access node to advertise a Macro Cell BSSID over the air, and support connections on that BSSID. In a Micro Cell network comprising one or more access nodes connected to a controller, an access node during initialization establishes one or more connections with its controller. As part of that initialization, the access node establishes connections for each radio in the access node, each connection established using the BSSID associated with a radio in the access node.

According to the present invention, as this connection is established with the controller, a Macro Cell Manager running on the controller recognizes BSSIDs associated with Macro Cell nodes. The Macro Cell manager sends control messages to the indicated BSSID, changing the radio associated with that BSSID to Macro Cell mode, and giving it a new BSSID to use for wireless communications. Other information such as channel selection and power levels may also be supplied.

During operation in Macro Cell mode, the radio applies wireless mac address translation (WMAT) to transmit traffic sent to its BSSID by the controller, translating the BSSID used on the controller link to the BSSID supplied for over the air Macro Cell operation. On the receive side, an ACK table is associated with the radio in Macro Cell operation, containing the STN MAC addresses of client devices to which it responds. When a frame from a client with an STN MAC address contained in the ACK table is received, an ACK is transmitted to that client, and the frame is forwarded to the controller. Entries are added to the ACK table based on message traffic transmitted, or by control messages from the controller. Certain incoming messages, which may include broadcasts and/or probe request frames, are forwarded to the controller, again using WMAT, translating the over-the-air Macro Cell BSSID to the BSSID used for the controller connection.

Figure 1:
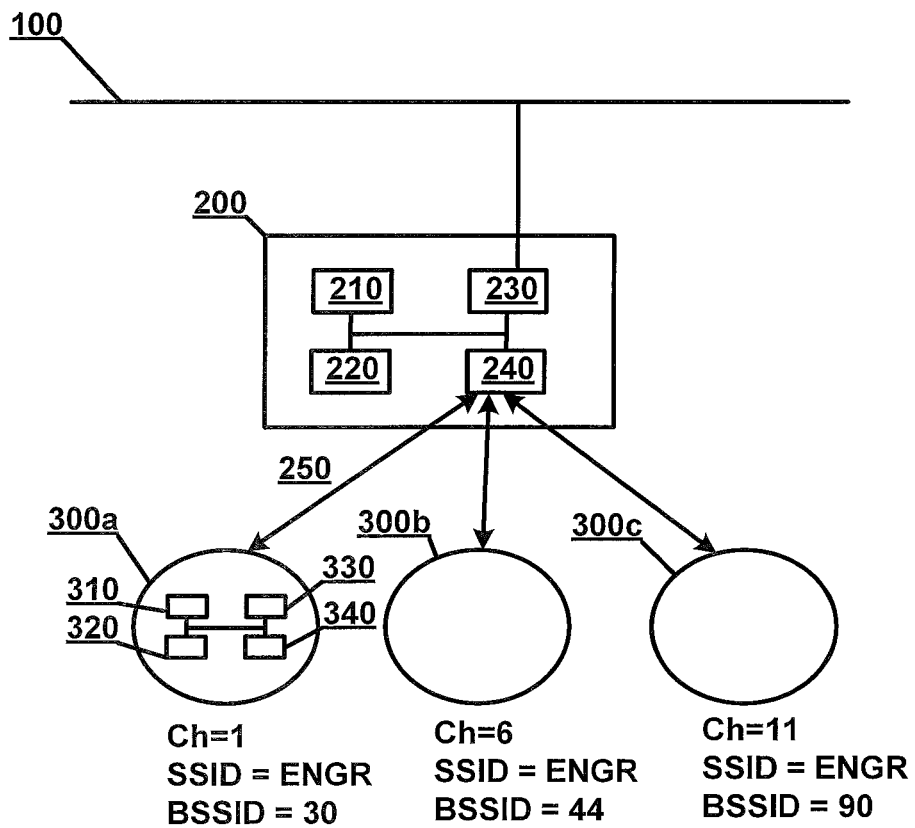
FIG. 1 shows a Micro Cell network.
Figure 1:
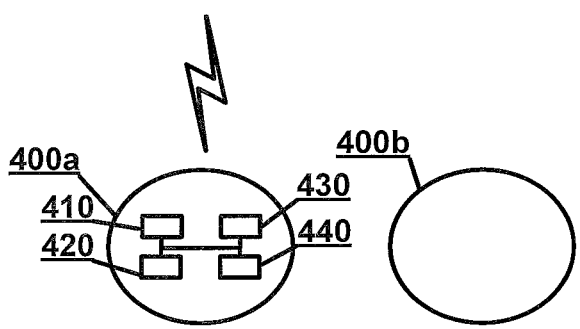

As shown in FIG. 1, a Micro Cell architecture network supports connections of wireless clients 400a, 400b to a wired network. Wired network 100, such as a wired IEEE 802.3 Ethernet network, is connected to controller 200. Controller 200 supports connections 250 to access nodes 300a, 300b, 300c. Access nodes 300a, 300b, 300c provide wireless communications to wireless clients 400a, 400b.

As is understood in the art, controller 200 is a purpose-built digital device having a CPU 210, memory hierarchy 220, and a plurality of network interfaces 230, 240. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interfaces 230, 240 are typically IEEE 802.3 Ethernet interfaces to copper, although high-speed optical fiber interfaces may also be used. Controller 200 typically operates under the control of purpose-built embedded software, typically running under a Linux operating system, or an operating system for embedded devices such as VXWorks.

Similarly, as understood by the art wireless access nodes 300a, 300b and 300c are also purpose-built digital devices. These access nodes include CPUs 310, memory hierarchy 320, and wireless interfaces 330. Wireless interfaces 330 may contain one or more radio transmitter/receiver pairs. As with controller 200, the CPU commonly used for such access nodes is a MIPS-class CPU such as one from Raza Microelectronics or Cavium Networks, although processors from other vendors such as Acorn, Intel, AMD, Freescale, and IBM may be used. The memory hierarchy comprises read-only storage for device startup and initialization, fast read-write storage such as DRAM for holding operating programs and data, and permanent bulk file storage such as compact flash. Wireless access nodes 300 typically operate under control of purpose-built programs running on an embedded operating system such as Linux or VXWorks. Wireless interfaces 330 are typically interfaces operating to the family of IEEE 802.11 standards including but not limited to 802.11a, b, g, and/or n.

Wireless client 400 is also a digital device, similarly having CPU 410, memory hierarchy 420, wireless interface 430, and I/O devices 450. As examples, wireless device 400 may be a general purpose computer such as a laptop, or may be a purpose-built device such as a Wi-Fi phone or a handheld scanner. In a general-purpose computer, CPU 410 may be a processor from companies such as Intel, AMD, Freescale, or the like. In the case of purpose-built devices, Acorn or MIPS class processors may be preferred. Memory hierarchy 420 comprises the similar set of read-only memory for device startup and initialization, fast read-write memory for device operation and holding programs and data during execution, and permanent bulk file storage using devices such as flash, compact flash, and/or hard disks. Additional I/O devices 450 may be present, such as keyboards, displays, speakers, barcode scanners, and the like.

In operation of the Micro Cell network according to FIG. 1, access nodes 300 start up, and establish a connection 250 with controller 200. Access nodes 300 may boot from images stored internally in memory hierarchy 320, by fetching an image from controller 200, or by a combination. The connection 250 established, for example, between access node 300*a* and controller 200 is established using standard TCP/IP, and is established with an ID, for example, the same value as the BSSID used for wireless transmissions, in this case, 31. As access node 300*a* continues its startup, it advertises wireless services on channel 1 using BSSID=30 and SSID="ENGR" as an example. Similarly, access nodes 300*b* and 300*c* start up, establishing communications links 250 with controller 200, and advertising wireless services as shown, each advertising the SSID "ENGR" but with different BSSIDs and on different channels.

While connection 250 is shown as a direct link between controller 200 and access nodes 300, this link may be a wired link such as an 802.3 Ethernet link, or a wireless link such as an 802.11 mesh network link, WiMax link, or other wireless backhaul. Wired links may be electrical, optical, or a combination, including passing through switched networks, for example, having an access node 300 at a remote location such as a user's home, connecting back to corporate controller 200 through public Internet connections. It should be noted that these connections 250 may be encrypted, for example using GRE tunnels. Traffic across this link 250, from access node 300 to controller 200 is identified, for example using the BSSID of the radio in access node 300.

Figure 2:
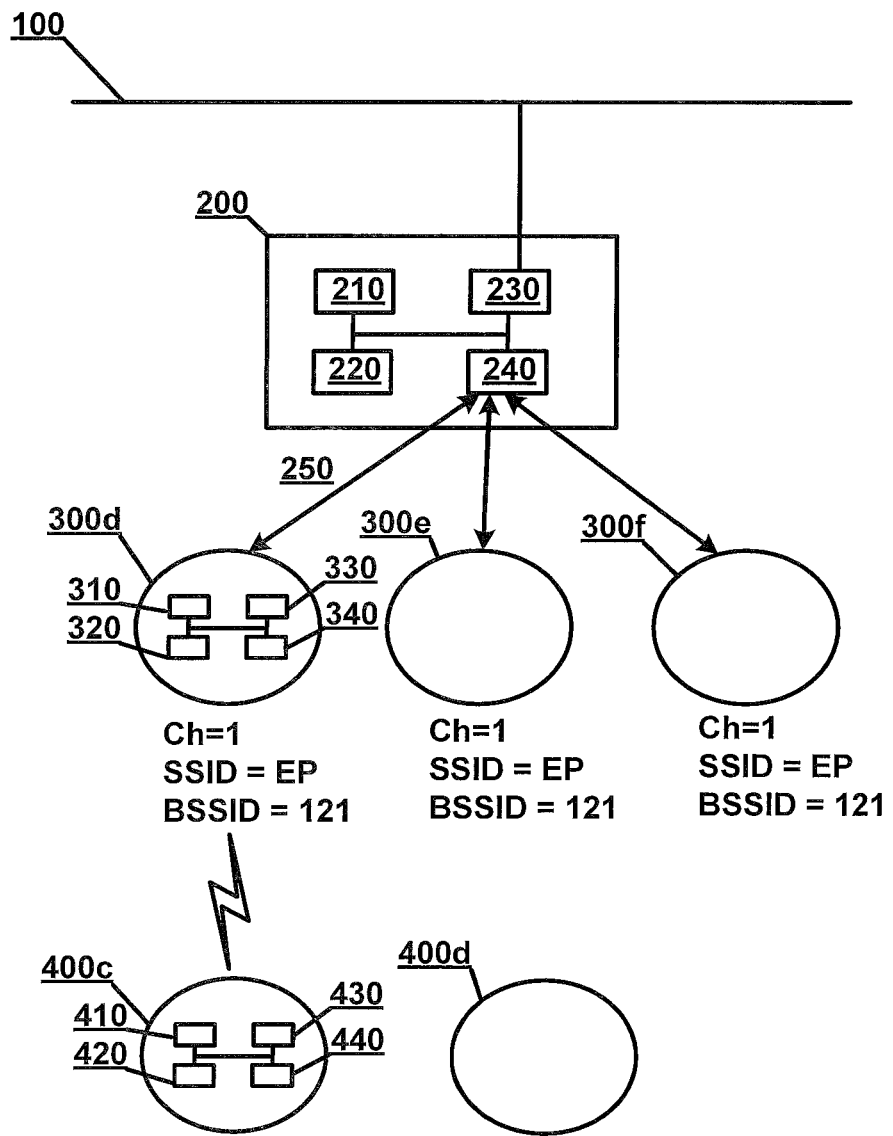
FIG. 2 shows a Macro Cell network.

While the internal architecture of controller 200, access nodes 300, and wireless client 400*a* in the Macro Cell network of FIG. 2 may be similar to their counterparts in FIG. 1, the operation of the wireless network is different. In the Macro Cell network, as shown in FIG. 2, multiple access nodes operate on the same channel, advertising the same BSSID, and therefore SSID, as an example, all operating on channel 1 with SSID="EP" and BSSID=121.

Figure 3:
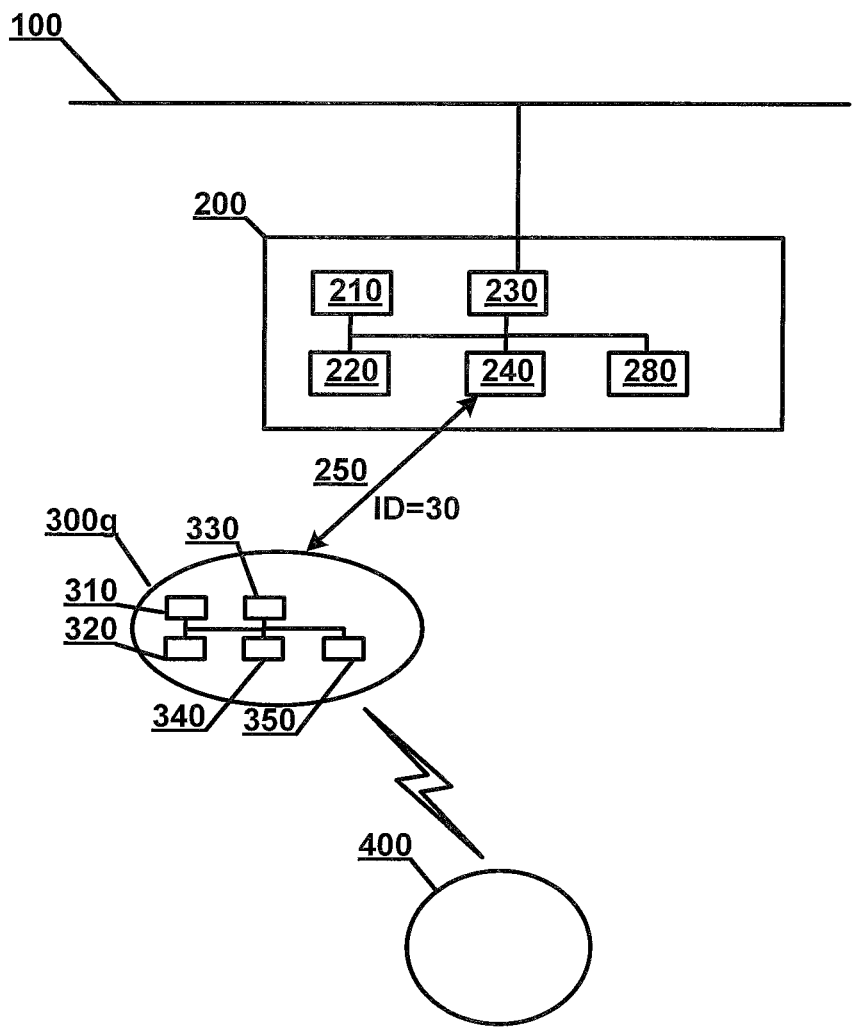
FIG. 3 shows details of a network.

According to an aspect of the present invention, one or more access nodes in a Micro Cell network during startup are converted to Macro Cell operation. As shown in FIG. 3, as access node 300*g* starts up, it establishes a connection with controller 200, identifying itself using a preset ID, for example its BSSID (BSSID1). This ID is recognized by the Macro Cell Manager process 280 running in controller 200. Macro Cell Manager 280 instructs access node 300*g* to switch to Macro Cell mode, supplying it with a new BSSID (BSSID2) to use for over-the-air communications. Other information, such as channel number and SSID may also be supplied. In transmit operation, packets sent by controller 200 to access node 300*g* using BSSID1 are translated using wireless mac address translation (WMAT) and transited over the air using the translated BSSID, BSSID2.

For receive operation, according to the present invention, a subset of frame types received by a Macro Cell access node such as access node 300*g* are forwarded directly to controller 200. This subset may include messages such as broadcasts and/or probe request frames, or other types as defined by Macro Cell manager 280 and/or controller 200. Frames sent from Macro Cell access node 300*g* to controller 200 undergo WMAT, substituting BSSID1 for BSSID2.

Other received frames are processed in Macro Cell access node 300*g* according to an ACK table 350 kept by access node 300*g*. Each frame received contains the STN MAC address of the device sending the frame, as well as BSSID2, the BSSID of the device to which the frame is addressed. ACK table 350 contains the STN MAC addresses of client devices to which access node 300*g* responds. When access node 300*g* receives a frame with an STN MAC address with a match in its ACK table, it transmits an ACK to that wireless client, and forwards the frame to controller 200. Entries to ACK table 350 may be added and/or deleted using control messages sent by controller 200 and/or Macro Cell manager 280. Entries may also be added to ACK table 350 automatically by Macro Cell access node 300*g*, by inspecting STN MAC addresses of messages received from controller 200 to be transmitted after WMAC using the over the air BSSID2, and adding those STN MAC addresses not already present in ACK table 350.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A method comprising:
   receiving, by a first network device, a first frame comprising a first network identifier which is used by the first network device for over-the-air communication on a first channel in a first wireless network, wherein the first network identifier includes a first Basic Service Set Identifier (BSSID); and
   translating, by the first network device, the first network identifier into a second network identifier based on a Media Access Control (MAC) address of the first network device, wherein the second network identifier including a second Basic Service Set Identifier (BSSID) which differs from the first BSSID.

2. The method of claim 1, further comprising:
   substituting, by the first network device, the first network identifier for the second network identifier in the first frame to generate a second frame.

3. The method of claim 2, further comprising:
   transmitting, by the first network device, the second frame comprising the second network identifier to a second network device.

4. The method of claim 3, further comprising:
   receiving, at the first network device, a third frame comprising the second network identifier which is based on the MAC address of the first network device; and
   forwarding, by the first network device, the third frame comprising the second network identifier to the second network device.

5. A method comprising:
   receiving, by a first network device, a first frame comprising a first network identifier including a first Basic Service Set Identifier (BSSID); and
   translating, by the first network device, the first network identifier into a second network identifier based on a Media Access Control (MAC) address of the first network device, wherein the second network identifier is received from a second network device and used by the first network device for over-the-air communication on a first channel in a first wireless network, and wherein the second network identifier includes a second Basic Service Set Identifier (BSSID) that is different from the first BSSID.

6. The method of claim 5, further comprising:
substituting, by the first network device, the first network identifier for the second network identifier in the first frame to generate a second frame.

7. The method of claim 6, further comprising:
transmitting, by the first network device, the second frame comprising the second network identifier over the air on the first wireless network on the first channel.

8. The method of claim 7, further comprising:
receiving, at the first network device, a third frame comprising the first network identifier which is based on the MAC address of the first network device; and
forwarding, by the first network device, the third frame comprising the first network identifier to a third network device.

9. A network device comprising:
a memory;
a processor;
a receiving mechanism coupled to the processor, the receiving mechanism to receive a first frame comprising a first network identifier which is used by the first network device for over-the-air communication on a first channel in a first wireless network, wherein the first network identifier includes a first Basic Service Set Identifier (BSSID); and
a translating mechanism coupled to the processor, the translating mechanism to translate the first network identifier into a second network identifier based on a Media Access Control (MAC) address of the first network device, wherein the second network identifier includes a second Basic Service Set Identifier (BSSID) which differs from the first BSSID.

10. The network device of claim 9, further comprising:
a substituting mechanism coupled to the processor, the substituting mechanism to substitute the first network identifier for the second network identifier in the first frame to generate a second frame.

11. The network device of claim 10, further comprising:
a transmitting mechanism coupled to the processor, the transmitting mechanism to transmit the second frame comprising the second network identifier to a second network device.

12. The network device of claim 11,
wherein the receiving mechanism further to receive a third frame comprising the second network identifier which is based on the MAC address of the first network device; and
wherein the network device further comprises a forwarding mechanism coupled to the processor, the forwarding mechanism to forward, to the second network device, the third frame comprising the second network identifier.

13. A network device comprising:
a memory;
a processor;
a receiving mechanism coupled to the processor, the receiving mechanism to receive a first frame comprising a first network identifier including a first Basic Service Set Identifier (BSSID); and
a translating mechanism coupled to the processor, the translating mechanism to translate the first network identifier into a second network identifier based on a Media Access Control (MAC) address of the first network device, wherein the second network identifier is received from a second network device and used by the first network device for over-the-air communication on a first channel in a first wireless network, and wherein the second network identifier includes a second Basic Service Set Identifier (BSSID) that is different from the first BSSID.

14. The network device of claim 13, further comprising:
a substituting mechanism coupled to the processor, the substituting mechanism to substitute the first network identifier for the second network identifier in the first frame to generate a second frame.

15. The network device of claim 14, further comprising:
a transmitting mechanism coupled to the processor, the transmitting mechanism to transmit the second frame comprising the second network identifier over the air on the first wireless network on the first channel.

16. The network device of claim 15,
wherein the receiving mechanism further to receive a third frame comprising the first network identifier which is based on the MAC address of the first network device; and
wherein the network device further comprises a forwarding mechanism coupled to the processor, the forwarding mechanism to forward the third frame comprising the first network identifier to a third network device.

17. A non-transitory computer-readable storage medium storing embedded instructions that are executed by one or more mechanisms implemented within a network device to perform a plurality of operations comprising:
receiving a first frame comprising a first network identifier being a first Basic Service Set Identifier (BSSID) that is used by the first network device for over-the-air communication on a first channel in a first wireless network;
translating the first BSSID into a second BSSID based on a Media Access Control (MAC) address of the first network device, wherein the second BSSID differs from the first BSSID;
substituting the first BSSID for the second BSSID in the first frame to generate a second frame; and
transmitting the second frame comprising the second BSSID to a second network device.

18. A non-transitory computer-readable storage medium storing embedded instructions that are executed by one or more mechanisms implemented within a network device to perform a plurality of operations comprising:
receiving a first frame comprising a first network identifier, the first network identifier includes a first Basic Service Set Identifier (BSSID);
translating the first network identifier into a second network identifier based on a Media Access Control (MAC) address of the first network device, wherein the second network identifier is received from a second network device and used by the first network device for over-the-air communication on a first channel in a first wireless network, and wherein the second network identifier includes a second Basic Service Set Identifier (BSSID) that differs from the first BSSID;
substituting the first network identifier for the second BSSID in the first frame to generate a second frame; and
transmitting the second frame comprising the second BSSID over the air on the first wireless network on the first channel.

19. The non-transitory computer-readable storage medium of claim 18, further comprising:
receiving a third frame comprising the first BSSID which is based on the MAC address of the first network device; and
forwarding the third frame comprising the first BSSID to a third network device.

20. The method of claim 1, wherein prior to translating the first network identifier into the second network identifier, the method further comprising:
    recognizing the first network identifier is associated with an access node being part of a macro cell network.

* * * * *